Nov. 21, 1967  E. L. TOMPKINS  3,353,886
THERMALLY INSULATED CONTAINER
Filed Feb. 21, 1966
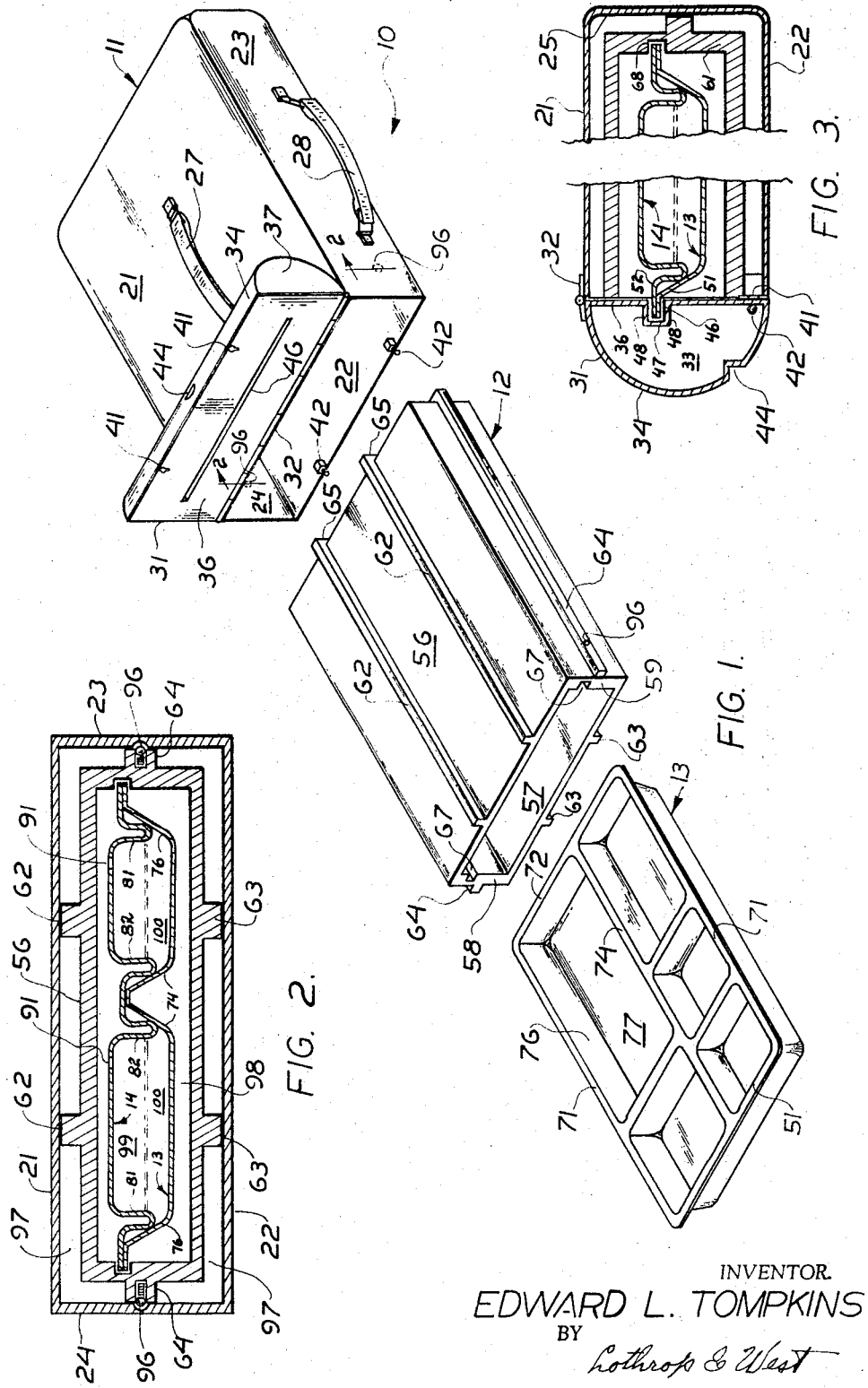
INVENTOR.
EDWARD L. TOMPKINS
BY
Lothrop & West
ATTORNEYS

United States Patent Office 3,353,886
Patented Nov. 21, 1967

3,353,886
THERMALLY INSULATED CONTAINER
Edward L. Tompkins, 5050 Roseville Road, D11,
North Highlands, Calif. 95660
Filed Feb. 21, 1966, Ser. No. 529,046
8 Claims. (Cl. 312—214)

ABSTRACT OF THE DISCLOSURE

A box containing a thermally insulating liner, the interior walls of the liner being slotted to receive the lips of a hot food tray thereby located in suspended relation within the liner.

---

The invention relates to portable containers for receiving and storing heated food trays for considerable periods of time.

The market place as well as the patent literature are replete with examples of portable, thermally insulated bottles, or other containers, which keep a cold liquid in cold condition or a hot liquid in a hot condition.

So far as is known, however, there are no comparable products which are especially adapted for storing food, such as, for example, food which is packaged and stored in disposable, compartmented trays commonly known as a TV dinner tray.

Heretofore, in other words, it has not been feasible to heat a TV dinner tray at home and carry the tray to a distant location, such as to a picnic spot or to a place of work, for the reason that the food becomes cold in a relatively short time.

It is therefore an object of the invention to provide a thermally insulated container which is particularly effective to carry a tray of hot food, and to maintain the food in a heated condition for an extended period.

It is another object of the invention to provide a thermally insulated container which is rugged and durable, yet is compact, light in weight and inexpensive to buy.

It is yet another object of the invention to provide a container for the storage of either hot or cold food with a minimum of heat transfer.

It is a further object of the invention to provide a food container which can readily be disassembled to afford thorough cleaning of the components.

It is another object of the invention to provide a generally improved thermally insulated container.

Other objects, together with the foregoing, are attained in the embodiment described in the following description and illustrated in the accompanying drawing, in which:

FIGURE 1 is an exploded perspective view of the container box and liner and a food tray;

FIGURE 2 is a transverse sectional view of the assembled device to an enlarged scale, the plane of the section being indicated by the line 2—2 in FIGURE 1, and including a tray lid;

FIGURE 3 is a fragmentary, median longitudinal section of the assembled device to an enlarged scale.

While the container of the invention is susceptible of numerous physical embodiments, depending on the environment and requirements of use, substantial numbers of the herein shown and described embodiment have been made, tested and used, and all have performed in an eminently satisfactory manner.

The container of the invention, generally designated by the reference numeral 10, comprises a hollow box 11 and a removable, insulating liner 12, adapted to receive a conventional, compartmented food tray 13, together with a tray lid 14, or cover (see FIGURES 2 and 3).

The hollow box 11 is generally elongated and possesses a rather shallow profile, the box being defined by a top wall 21, or top panel, a bottom panel 22, a first side panel 23, a second side panel 24, and an end panel 25 (see FIGURE 3).

For convenience in carrying the device in a horizontal attitude, if desired, is a top handle 27 mounted on the top panel 21; and for carrying the device in a vertical position, a side handle is mounted on the side panel 23, said side handle being designated as 28. The handles 27 and 28 are preferably of the attache case variety which fold into a relatively flat position when not in use.

The front end of the box affords a rectangular opening through which the liner 12 can be inserted and removed, when desired, for cleaning the components.

Closure of the open front end is effected by a door 31 hingeably mounted on the front end of the top panel 21 by a piano type hinge 32.

As appears most clearly in FIGURE 3, the door 31 is hollow and is substantially semicircular in cross-section, the hollow interior chamber 33 affording a substantial dead air space in the interests of thermal insulation. Defining the interior chamber 33 of the door is an arcuate outer wall 34, a substantially planar inner panel 36 and a pair of semi-circular opposite end panels 37 enclosing the ends of the door.

A spaced pair of spring clips 41 of conventional construction mounted on the door are effective to engage with a corresponding pair of latch members 42 on the bottom panel and which selectively snap into and out of engagement with the spring members 41 to hold the door closed or to release the door when the door is to be opened. A preformed offset portion 44, or notch, in the door provides the user with a convenient finger grip on the door to effect unlatching and opening of the door.

As another important feature of the door, there is formed in the inner door panel 36 an elongated transverse slot 46 defined by offset wall portion 47 and opposed wall portions 48 (see FIGURE 3).

The slot 46 serves, as will subsequently be explained in more detail, to receive the front lip 51 and front flange portion 52 of the tray 13 and the tray lid 14, respectively, when the door is in closed position.

The liner 12 is of the same general configuration as the box 11, although somewhat smaller in its dimensions to provide an insulating, dead air space surrounding the liner.

The liner 12 comprises an upper wall 56, a lower wall 57, a first side wall 58, a second side wall 59, and an end wall 61 (see FIGURE 3). The liner is uniformly spaced from the enclosing box walls by a pair of longitudinal top strips 62, a pair of bottom strips 63, a pair of side strips 64 and a pair of vertical end strips 65. The strips serve not only as spacers but also snugly engage with the surrounding box walls to minimize rattling and vibration as the container is moved.

Formed in the liner side walls 58 and 59 as well as in the liner end wall 61 is a pair of longitudinal slots 67 and a transverse slot 68, respectively, the slots serving as tracks snugly supporting the side lips 71 and the end lip 72, respectively of the food tray 13.

The food tray 13 is conventional and can be of any desired configuration. In the usual case, as illustrated herein, the tray comprises a plurality of compartments separated by upstanding dividers 74, and with encompassing side walls 76 rising from the tray bottom 77. The tray lips 51, 71 and 72 are out-turned from the upper portion of the side walls in customary fashion.

Frequently, as in the case of "TV dinners," the tray is packaged with frozen foods, and is provided with a disposable paper cover which is ordinarily removed at the time the tray is heated in the oven.

In operation, the heated tray is removed from the oven and inserted in the liner through the open end and with the leading ends of the tray side lips placed in the slots 67 in the side walls 58 and 59 of the liner. As will be understood, this operation is customarily performed with the liner previously located within the box 11.

The tray is urged inwardly until the nether lip 72 of the tray engages the transverse end slot 68 in the liner end wall 61.

The box lid 31, or door, is then swung into closed and latched position, the trailing lip 51 of the tray being concurrently lodged within the transverse slot 46 in the door panel 36, as appears most clearly in FIGURE 3.

While the arrangement heretofore described, using the tray alone, works satisfactorily, it has been found that the use of the tray lid 14, or tray cover, in conjunction with the tray offers substantial additional advantages, both from the aspect of securely confining the hot food in the tray and from the point of view of providing superior insulating capabilities.

The lid 14 in many respects is an inverted counterpart of the tray 13. That is to say, the lid includes a peripheral, substantially horizontal lip, four encompassing exterior side walls 81 and a plurality of interior dividers 82 arranged to define compartments bearing an inverted, or substantially mirror symmetry, relationship with respect to the tray compartments, as is shown most clearly in FIGURE 2.

The exterior side walls 81 and the interior dividers 82 are preferably formed to the U-shaped configuration shown in somewhat exaggerated fashion in FIGURES 2 and 3 to provide a degree of resiliency. Thus, when the lid 14 is placed in registry on top of the hot food tray and urged gently downwardly, the lower ends of the lid walls 81 and the lid dividers 82 engage and slightly deform the subjacent tray walls 76 and tray dividers 74, respectively, thus affording a seal preventing escape of the hot food located within the tray compartments.

After the lid is placed on the tray, as described, the two members are slid in unison into the tracks in the liner 12 previously located within the box 11. The vertical height of the tracks, or slots, is such as snugly to receive the tray lip and the lid lip, thus maintaining an effective seal.

By thus confining the food, it is possible to carry the entire device by the handle 28, with the box, the liner and the tray disposed in a vertical attitude.

In some instances, and for certain types of foods, it is desirable to accord a vent hole 91 in one or more of the inverted tray lid compartments, as is indicated in FIGURE 2. The vents 91 are formed in the lid adjacent the right-hand portion (see FIGURE 2) of the lid compartments, i.e. toward the side 23 of the box 11. Consequently, when the user picks up the device by the side handle 28 and the container is carried in a vertical attitude, the food 100 within the compartments moves toward the left-hand portion (see FIGURE 2) of the tray and the sealing lid in a direction away from the vents and thus does not escape through the vents 91.

The device is capable of keeping the food hot for at least several hours. When it is desired to remove the tray, the box is placed in horizontal attitude and the box door is opened, thus exposing the near lips of the tray and the tray lid. By grasping these lips, the tray and the lid can readily be withdrawn.

Although the fit of the lips within the liner tracks is relatively snug, the liner remains in place owing to the provision of a pair of ball detents 96, as appears most clearly in FIGURE 2. While the detents are effective to restrain translation of the liner as the tray is removed, it is apparent that the liner can be withdrawn, by using greater force, so as to permit cleaning of the liner and the inside of the box as desired.

As will be noted by especial reference to FIGURE 2, there is not only a first dead air space 97 between the box and the liner, but, owing to the tray supporting arrangement of the liner slots there is a second air space 98 between the tray and the liner. Lastly, the use of the inverted lid 14 affords still another dead air space 99 above the food 100.

It can therefore be seen that I have provided a highly efficient, portable container for the temporary storage of hot food.

What is claimed is:

1. A thermally insulated container comprising:
 (a) a hollow box including a top panel, a bottom panel, a pair of side panels, an end panel covering one end and a door hingeably and latchably mounted on said box to cover the other end thereof; and,
 (b) a liner disposed within said box, said liner including an upper wall, a lower wall, a pair of side walls, an inner end wall, and a plurality of spacers mounted on the outside of said walls to position said liner snugly within said box with said walls of said liner separated from the adjacent walls of said box, the interior surfaces of said liner side walls and said inner end wall being formed with registering slots extending the length of said liner side walls and the width of said end wall to receive the laterally extending and inner end lips of a food tray in slidable and supporting relation, the vertical distance between said slots and said lower wall of said liner being greater than the vertical distance between said tray bottom and said lower wall of said liner.

2. The device of claim 1 further characterized by means on said box and on said liner for detachably engaging said liner on said box.

3. The device of claim 1 wherein said spacers comprise a plurality of elongated strips.

4. The device of claim 1 further characterized by a removable tray cover having a peripheral flange in registry with the lips of said tray, the side portions and one end portion of said flange being locatable within said slots in face to face relationship with the adjacent lips of said tray.

5. The device of claim 4 wherein said cover is formed with peripheral sealing members to engage snugly with the walls of the food-containing recesses in said tray and wherein said cover is provided with recesses in inverted relation with respect to said tray recesses.

6. The device of claim 5 wherein the walls of said cover recesses include a vent opening adjacent one side thereof.

7. The device of claim 6 further characterized by a handle on the upper surface of said top wall of said box, and a handle on the outside of one of said side walls of said box.

8. The device of claim 5 wherein said door on said box is formed with a slot to receive the adjacent lip of said tray and the adjacent flange portion of said cover in closed position of said door.

References Cited

UNITED STATES PATENTS

| | | | |
|---|---|---|---|
| 2,239,128 | 4/1941 | Sykes | 312—214 |
| 2,457,043 | 12/1948 | Histand | 206—4 |
| 3,016,129 | 1/1962 | King | 206—4 |
| 3,025,947 | 3/1962 | Hammer | 206—4 |
| 3,026,995 | 3/1962 | Slaughter | 206—4 |
| 3,130,288 | 4/1964 | Monaco et al. | 312—214 X |

CASMIR A. NUNBERG, *Primary Examiner.*